United States Patent [19]

Tajkowski

[11] 4,192,923
[45] Mar. 11, 1980

[54] AMINO RESIN FOAM, ONE-PHASE SOLUTION FOAM PRECURSOR AND METHOD OF PRODUCING FOAM

[75] Inventor: Edward G. Tajkowski, Williamsville, N.Y.

[73] Assignee: Allied Chemical Corporation, Morristown, N.J.

[21] Appl. No.: 955,439

[22] Filed: Oct. 27, 1978

[51] Int. Cl.² ............................................... C08J 9/30
[52] U.S. Cl. ...................................... 521/117; 521/65;
521/131; 521/187; 521/188; 521/913; 528/254;
528/259
[58] Field of Search ...................... 521/187, 188, 117

[56] References Cited
U.S. PATENT DOCUMENTS 3,793,161  7/1968  Avis ...................................... 521/188

*Primary Examiner*—Morton Foelak
*Attorney, Agent, or Firm*—Alan M. Doernberg; Jay P. Friedenson

[57] ABSTRACT

Amino resin foams of the urea-formaldehyde or urea-melamine-formaldehyde type formed from a one-phase solution of methylene chloride solvent, propylene glycol co-solvent, catalyst and polymer precursors which may be urea and formaldehyde or urea, melamine and formaldehyde. As reaction occurs between the polymer precursors in the solution, the methylene chloride in the solution vaporizes foaming the resin. In the product foam, the propylene glycol acts as a plasticizer and the methylene chloride as the blowing agent in a closed-cell foam having superior stability and insulative properties. The product foam is useful in building insulation and for other insulative purposes.

14 Claims, No Drawings

AMINO RESIN FOAM, ONE-PHASE SOLUTION FOAM PRECURSOR AND METHOD OF PRODUCING FOAM

BACKGROUND OF THE INVENTION

Urea-formaldehyde foams have been traditionally made by air-frothing an aqueous suspension or dispersion of urea, formaldehyde, acid catalyst and detergent in water. Frequently, some or all of the formaldehyde and some of the urea is introduced as a condensate wherein the formaldehyde and urea may have partially reacted. Typically, the formaldehyde:urea molar ratio (called in the trade F:U ratio) is greater in the concentrate than in the final product. Thus, the concentrates UF Concentrate-85, a tradename of Allied Chemical Corporation, and "Arboneeld" B, a tradename of E. I. du Pont de Nemours and Company have F:U ratios of, respectively, about 4.8:1 and about 4.1:1. By contrast, most urea-formaldehyde foam products have an F:U ratio between about 1.4:1 and about 2.5:1 and especially between about 1.6:1 and about 2.0:1. These ratios are lowered to the desired levels by adding free urea to the concentrate before or during polymerization.

Such air-frothed urea-formaldehyde foams are generally open-cell in structure and have limited insulative properties and stability. Upon decomposition, such foams emit an unpleasant formaldehyde odor.

There have been suggestions for using low-boiling water insoluble liquids such as the hydrocarbons propane, butane and pentane, several fluorocarbons including dichlorotetrafluoroethane (fluorocarbon 114) and trichloromonofluoromethane (fluorocarbon 11) and other materials such as ethyl chloride, each together with a surface active agent to produce an emulsion with which the polymer precursor components are mixed. Such emulsions generally give product foams which are irregular in cell size and distribution or have generally opened-celled structures. These foams also have insufficient insulative properties and stability for many desired uses.

BRIEF DESCRIPTION OF THE INVENTION

The present invention includes a one-phase solution capable of exothermic reaction to form an amino resin foam consisting essentially of:

(a) from about 2 to about 20% by weight methylene chloride;

(b) from about 10 to about 40% by weight propylene glycol;

(c) from about 30 to about 56% by weight formaldehyde;

(d) from about 35 to about 59% by weight urea;

(e) from 0 to about 14% by weight melamine; all of the above by weight of resin solids, as hereinafter defined;

(f) from 0 to about 25% by weight of total composition water; and (g) an acidic catalyst which promotes the reaction of urea (or melamine-urea) and formaldehyde and which is soluble in said solution in an amount sufficient to bring pH to 3.0 or below. The present invention also includes a method of forming an amino resin foam which comprises the steps of:

(a) mixing a first composition of propylene glycol, urea (or melamine-urea) and formaldehyde with additional urea, methylene chloride and a catalyst which promotes the reaction of urea and formaldehyde, in proportions giving a one-phase solution;

(b) reacting the urea and formaldehyde in the one-phase solution to form a resin by an exothermic reaction; and (c) foaming said resin by the evaporation of methylene chloride in the one-phase solution.

The present invention also include an amino resin foam produced from the one-phase solution of the present invention or produced by the method of the present invention.

DETAILED DESCRIPTION OF THE INVENTION

A principal feature of the present invention is that an amino resin foam can be produced by mixing the several ingredients into a one-phase solution. The result is a substantially homogenous mixture of polymer precursors and methylene chloride blowing agent. As a result, when reaction begins to occur between the polymer precursors, either urea-formaldehyde or urea-melamine-formaldehyde, the heat evolved can vaporize dissolved methylene chloride, uniformly forming small bubbles which result in a uniform, fine, closed cell foam having superior insulation properties and stability. The identity and proportions of the several components of the one-phase solution are selected with two purposes in mind. First, no component may be present in such proportions that prevent the solution from being one-phase. It should be understood that by one-phase is meant a single continuous phase rather than a dispersion, emulsion or completely separate phases. Although less preferred, micro-emulsions which are substantially clear because the size of the discontinuous phase is small are included within the present invention. Nevertheless, the preferred solutions of the present invention appear on visual observation to be translucent or clear.

It should be understood that, as reaction occurs between the polymer precursors, as catalyzed by the catalyst in the solution, at some point the forming polymer will cease to be dissolved in the solution. The product aminoresin foam is in fact highly insoluble in most conventional solvents, including methylene chloride. It is a part of the present invention, however, that foamed resins which at some point in their history have been a one-phase solution provide more uniform and better insulating foams than those which have never been more homogenous than an emulsion, suspension or dispersion.

The components of the one-phase solution are methylene chloride, propylene glycol, formaldehyde, urea, melamine (which may or may not be present), water (which may or may not be present) and a catalyst which promotes the reaction of urea and formaldehyde and which is soluble in the solution.

By "resin solids" is meant all ingredients expected to be incorporated into the resin body rather than evaporate into the cells. Included in "resin solids" are the resin components (urea, formaldehyde and melamine, if present), propylene glycol, the surfactant, the catalyst and other additives which would react with these materials during polymerization. Excluded from "resin solids" are water and methylene chloride and any other additive expected to evaporate into the cells.

Methylene chloride and propylene glycol are materials readily available on the commercial market. Methylene chloride is both a known solvent and a known propellant. Propylene glycol is both a known solvent or co-solvent and a known plasticizer for various resins including urea-formaldehyde and other amino resins. Nevertheless, the use and proportions of methylene chloride necessary to form a one-phase solution capable on exothermic reaction of forming an amino resin foam is not known. Similarly, the proportion of propylene glycol necessary to act as a co-solvent to methylene chloride and maintain the one-phase solution is also not known to the art. It is in the nature and proportion of this solvent and co-solvent that the present invention differs from the pecursor emulsions and dispersions used to form the prior art urea-formaldehyde foams.

The polymer precursors used in the present foams are themselves conventional. Thus, formaldehyde and urea are present in the solution at a range giving the desired F:U ratios known to the prior art. Furthermore, in some preferred forms of the invention, all of the formaldehyde and some of the urea are present as a urea-formaldehyde condensate such as the UFC-85 and "Arboneeld" B products referred to above. It is within the scope of the present invention to optionally use a small proportion of melamine in addition to urea and formaldehyde. In general, melamine is substituted for urea at a rate of 2 moles of melamine for each 3 moles of urea removed. Preferably, the proportion of melamine in the solution is less than about 15% by weight of the total resin, wherein "resin" is defined as comprised of only urea, melamine (if present) and formaldehyde. It is also preferred that the melamine constitute less than about 25% of the total urea and melamine by weight, because melamine is a more expensive material. A preferred range is about 15-25% melamine by combined weight of urea and melamine. Nevertheless, foams made with a smaller proportion of melamine also have greatly enhanced strength, stability and uniformity, as well as a greater density, than foams made from urea and formaldehyde alone.

The melamine and formaldehyde, as well as some of the urea, may be present as a concentrate as well. Preferred forms of such concentrates are the urea-melamine-formaldehyde composition denominated "Composition I" in U.S. Pat. Nos. 3,891,590, 3,979,492 and 4,011,363 of R. D. Sundie et al.

The present composition may also contain some water, although the water content is preferably below about 25% by weight of total composition. The water may be present as a solvent for the urea-formaldehyde concentrate or for the urea-melamine-formaldehyde. Stabilizers may also be present in the solution, typically as components of one of the two concentrates.

The composition also contains a catalyst which promotes the reaction or urea and formaldehyde, as is conventional. It should be appreciated that such catalysts also promote the reaction of melamine, urea and formaldehyde. The determination of the amount of such catalyst necessary can be determined by routine experimentation. In general, increasing the amount of a particular catalyst causes a quicker curing resin. Suitable catalysts include acidic materials which are soluble in the solution and especially soluble in propylene glycol. Many acids and acidic salts are suitable such as, for example, acetic, maleic, malic, formic, alkyl benzene sulfonic and toluene sulfonic acids; hydrochloric, sulfuric and phosphoric acids; and ammonium sulfate, ammonium acid phosphate and ammonium sulfamate. Preferred catalysts are sulfuric, phosphoric, toluene sulfonic and alkyl benzene sulfonic acids. Toluene sulfonic acid is especially preferred. Inorganic acid salts may also be used if they are soluble in the solution. The determination of which acids and acidic salts are soluble in the components can be made by routine experimentation. One group of preferred solutions are those containing no melamine, such that the product amino resin foam is a urea formaldehyde foam.

The composition may also contain one or more surfactants. Suitable surfactants may be chosen from among well-known anionic and/or non-ionic surface active agents, selected for their froth-inducing or froth-stabilizing properties or for their additional contributions to the foamed resin system. For example, preferred anionic surfactants include alkyl benzene sulfonic acids which may act as both froth inducers and as part of the acidic catalyst mixture. Another preferred group of surfactants are a foam thickeners and stabilizers such as alkanolamides based on fatty acids. Yet another preferred group of surfactants are alkanolamides based on fatty esters, such as those conventionally used for foam building and shampoo thickening.

The method of the present invention involves mixing a first composition of propylene glycol, urea and formaldehyde with additional urea, methylene chloride and the catalyst in proportions giving the one-phase solution, and then reacting the precursors in the solution to form resin by an exothermic reaction which vaporizes the methylene chloride in the one-phase solution to foam the resin. It should be appreciated that the total amount and rate of heat release from the reaction will depend upon the proportions of polymer precursors and catalyst. By contrast, the amount present of methylene chloride compared to other materials, including propylene glycol, water and the like, will affect the proportion of such heat used to vaporize methylene chloride as contrasted to merely heating the remaining liquids of the solution. Thus, if too much water or other liquids are present in the solution, then the polymerization reaction may have proceeded undesirably far before substantial amounts of methylene chloride bubbles are formed. Thus, preferably, the total content of unreactive liquids is less than 40%. In the method of the invention, the first composition may contain propylene glycol, urea and formaldehyde as well as melamine if melamine is to be used. Additional urea, methylene chloride and propylene glycol may be separately added to the first composition. Nevertheless, it is preferred that the methylene chloride be premixed as a second composition with additional propylene glycol. It is still more preferred that methylene chloride and catalyst both be pre-mixed with additional propylene glycol as a second composition. Preferably, sufficient propylene glycol is used in the second composition to dissolve methylene chloride and catalyst. It is also preferred that sufficient propylene glycol be present in the first composition to dissolve the urea and formaldehyde or the melamine, urea and formaldehyde. If a urea-formaldehyde concentratrate or a urea-melamine-formaldehyde concentrate is used, then preferably it is sufficiently non-viscous to be completely dissolved by the propylene glycol of the first composition. Surfactants may be added to either first or second composition, or, preferably, some in each composition.

One group of preferred embodiments of the method of the present invention are those wherein the first composition is a mixture of a urea-melamine-formaldehyde concentrate with propylene glycol. Especially suitable urea-melamine-formaldehyde concentrates are those which contain from about 15 to about 25 weight percent urea, from about 30 to about 70 weight percent formaldehyde, from about 4.0 to about 20 weight percent melamine, from about 10 to about 25 weight percent water and from about 0.05 to about 4.0 weight percent of a stabilizer comprising a buffering agent which agent maintains pH of the concentrate within the range from about 4.0 to about 7.5. It should be appreciated that such a composition is described in each of U.S. Pat. Nos. 3,891,590, 3,979,492 and 4,011,363 each to R. D. Sundie et al. The portions of each of these patents referring to the preparation and composition of "component I" are incorporated herein by reference as urea-melamine-formaldehyde concentrates suitable for mixture with propylene glycol to form the first composition of the present invention. It should be appeciated that such stabilized compositions as described in the Sundie et al. patents maintain low viscosity over long periods of storage such that they can thereafter be mixed with propylene glycol to form the first compositions of the present invention.

It should also be appreciated that, once the one-phase solutions of the present invention are formed, foam formation occurs readily by catalyst reaction and methylene chloride vaporization. The control and containment of such foams requires techniques readily known in the foaming art, particularly in the known technology relating to polyurethane foams.

The present invention is illustrated by the following examples, which are not intended to limit the scope of the present invention.

EXAMPLE 1

Urea-Formaldehyde Foam

The components of Part A shown in Table 1 were mixed and stirred in a vessel at room temperature until a uniform, clear solution was obtained. The components of Part B shown in Table 1 were mixed and stirred in a closed vessel (to contain methylene chloride vapor) until a uniform clear solution was obtained. Part B was then added to Part A, and the mixture was stirred briskly for 15 to 60 seconds and poured into a suitable mold where the reaction, foaming and rising was completed. The weight percent of components in the overall mixture are shown in Table 1.

Table 1

| Part A | Part B | | Weight % |
|---|---|---|---|
| UFC-85 Concentrate[1] | 450 gm. | | 49.8% |
| Free urea | 225 gm. | | 24.9% |
| Propylene glycol | 54 gm. | | 6.0% |
| Ninol AA62 Extra[2] | 6.3 gm. | | 0.7% |
| 70% sorbitol | 15.7 gm. | | 1.7% |
| | Propylene glycol | 63.0 gm. | 7.0% |
| | Methylene chloride[4] | 62.0 gm. | 6.9% |
| | BioSoft[3] S-100 | 20.7 gm. | 2.3% |
| | Ninol AA62[2] | 3.2 gm. | 0.4% |
| | 50% sulfuric acid | 4.5 gm. | 0.5% |
| Total | 751.1 gm | 153.4 gm. | 100% |

| | | % of total | % of Resin[5] Solids |
|---|---|---|---|
| Total urea | 337.5 gm. | 37.3% | 44.0% |
| Total formaldehyde | 270.0 gm. | 29.9% | 35.3% |
| Total water | 74.5 gm. | 8.2% | — |
| Total surfactants and and foaming agents | 41.2 gm. | 4.6% | 5.4% |
| Total propylene glycol | 117.0 gm. | 12.9% | 15.3% |
| Total methylene chloride | 62.0 gm. | 6.9% | — |

Weights, total composition: 904.5 gm.

Table 1-continued

| Total resin solids: | 765.7 gm. | 100.0% |
|---|---|---|

[1]Allied Chemical Corporation: 60 weight % formaldehyde, 25 wt. % urea, 15 weight % water
[2]Non-ionic surfactants from Stepan Chemical Company
[3]Dodecylbenzene sulfonic acid surfactant from Stepan Chemical Company.
[4]Measured as 47 ml by volume.
[5]"Resin Solids" is defined as all ingredients expected to be incorporated into the resin body rather than evaporate into the cells or into surrounding atmosphere; i.e. all but the methylene chloride and water in above formulation.

The foam of Example 1 had a core density of 7.66 pcf, a water absorption of 244% weight gain after ten days at 30° C. and 100% relative humidity and a volume change at 38° C. and 100% relative humidity of −0.5% (after one day), −3.0 (after three days) and −6.2 (after ten days). After ten days at 38° C. and 100% relative humidity, the foam was badly warped, fragile and deteriorating. The foam was somewhat brittle and crushed easily.

EXAMPLE 2

Urea-Melamine-Formaldehyde Foam

Example 1 was repeated using Component MF, a urea-melamine-formaldehyde concentrate, and other reagents in proportions shown in Table 2. The resultant rigid foam had superior strength, dimensional stability and physical properties to the foam produced in Example 1.

In particular, the foam of Example 2 had a core density of 5.43 pcf, a water absorption of 214% weight gain after ten days at 38° C. and 100% relative humdity and a volume change at 38° C. and 100% relative humidity of +3.7 (after one day), +0.2% (after three days) and −3.3% (after 10 days). The foam was slightly brittle and less crushable than the foam of Example 1.

Table 2

| Part A | Part B | | Weight % |
|---|---|---|---|
| Component MF[1] | 200 gm. | | 54.7% |
| Urea | 80 gm. | | 21.9% |
| Propylene glycol | 20 gm. | | 5.5% |
| Ninol AA62 Extra[2] | 2.4 gm. | | 0.7% |
| 70% sorbitol | 6. gm. | | 1.6% |
| | Propylene glycol | 24.0 gm. | 6.6% |
| | Methylene chloride[4] | 23.8 gm. | 6.5% |
| | BioSoft S-100[3] | 6.0 gm. | 1.6% |
| | Ninol AA62[2] | 1.2 gm. | 0.3% |
| | 50% sulfuric acid | 2 gm. | 0.5% |
| Total | 308.4 gm | 57.0 gm. | 100% |

| | | % of Total | % of Resin[5] Solids |
|---|---|---|---|
| Total urea | 122.3 gm. | 33.5% | 42.0 |
| Total melamine | 10. gm. | 2.7% | 3.4% |
| Total formaldehyde | 101.4 gm. | 27.8% | 34.8% |
| Total water | 48.8 gm. | 13.3% | —% |
| Total surfactants and foaming agents | 13.8 gm. | 4.7% | |
| Total propylene glycol | 44. gm. | 12.0% | 15.5% |
| Total methylene chloride | 23.8 gm. | 6.5% | —% |
| Weight, Composition | Consumption | 364.1 gm. | |
| Total Resin Solids: | 291.5 gm. | | 100% |

[1]Allied Chemical Corporation: 84.5% UFC-85, 5% melamine,0.2% ammonium acetate stabilizer, 10.3% water.
[2]Non-ionic surfactants from Stepan Chemical Company
[3]Dodecylbenzene sulfonic acid surfactant from Stepan ChemicalCompany. Chemical Company. 4Measured as 18 ml by volume.
[5]"Resin Solids" is defined as all ingredients expected to be incorporated into the resin body rather than evaporate into the cells or into surrounding atmosphere; i.e. all but the methylene chloride and water in above formulation.

EXAMPLE 3

Urea-High Melamine-Formaldehyde Foam

A preresin solution was prepared using 84.5 gms (80.7 wt. %) UFC-85 concentrate charged to a flask equipped with a stirrer, heating and cooling means and means for monitoring both temperature and pH. Melamine (10 gms (9.6 wt. %) and water (10 gms (9.6 wt. %)) were added with stirring along with ammonium acetate (0.2 weight %) added as required to maintain a pH of 5.5-5.7 at working temperatures. The charge was then heated to 68°-72° C. for 10-15 minutes to produce a clear, moderately viscous (25-50 centipoise) solution. This preresin was then cooled to room temperature. If the pre-resin was to be stored for several days the pH was adjusted to 5.5-5.7 as required with ammonium hydroxide or acetic acid.

This "10% melamine preresin" was then used to produce a foam from the reagents shown in Table 3 following the procedures of Examples 1 and 2. The product foam was superior even to the foams of Example 2.

In particular, the foam of Example 3 had a core density of 3.5 pcf, a water absorption of 166% after ten days at 38° C. and 100% relative humidity and a volume change at 38° C. and 100% relative humidity of +5.1% (after one day), +1.5% (after three days) and −0.3% (after ten days). The foam was tough and resisted dusting and cracking.

Table 3

| Part A | Part B | | Weight % |
|---|---|---|---|
| 10% melamine preresin[1] | 104.7 gm. | | 56.7% |
| Urea | 37.6 gm. | | 20.4% |
| Propylene glycol | 10.0 gm. | | 5.4% |
| Ninol AA62 Extra[2] | 1.2 gm. | | 0.6% |
| 70% sorbitol | 3.0 gm. | | 1.6% |
| | Propylene glycol | 12.0 gm. | 6.5% |
| | methylene chloride[4] | 9.0 gm. | 4.9% |
| | BioSoft S-100[3] | 4.0 gm. | 2.2% |
| | Ninol AA62[2] | 1.2 gm. | 0.6% |
| | 50% sulfuric acid | 2. gm. | 1.1% |
| Total composition | 156.5 gm. | gm. | 100% |

| | | % of total | % of Resin[5] Solids |
|---|---|---|---|
| Total urea | 58.7 gm. | 31.8% | 38.8% |
| Total melamine | 10.0 gm. | 5.4% | 6.6% |
| Total formaldehyde | 50.7 gm. | 27.4% | 33.6% |
| Total water | 24.6 gm. | 13.3% | — |
| Total surfactants and foaming agents | 9.7 gm. | 5.3% | 6.4% |
| Total propylene glycol | 22.0 gm. | 11.9% | 14.6% |
| Total methylene chloride | 9.0 gm. | 4.9% | — |
| Weights, total composition: | 184.7 gm. | | |
| Total resin solids | 151.1 gm. | | 100% |

[1] Prepared as described in text.
[2] Non-ionic surfactants from Stepan Chemical Company
[3] Dodecylbenzene sulfonic acid surfactant from Stepan Chemical Company.
[4] Measured as 6.8 ml by volume.
[5] "Resin Solids" is defined as all ingredients expected to be incorporated into the resin body rather than evaporate into the cells or into surrounding atmosphere; i.e. all but the methylene chloride and water in above formulation.

I claim:

1. A one-phase solution capable of exothermic reaction to form an amino resin foam consisting essentially of:
    (a) from about 2 to about 20% by methylene chloride by weight of resin solids;
    (b) from about 10 to about 40% propylene glycol by weight of resin solids;
    (c) from about 30 to about 56% formaldehyde by weight of resin solids;
    (d) from about 35 to about 59% by weight urea by weight of resin solids;
    (e) from 0 to about 14% melamine by weight of resin solids;
    (f) from 0 to about 25% water by weight of composition; and
    (g) an acidic catalyst which promotes the reaction of urea and formaldehyde and which is soluble in said solution in an amount sufficient to lower the pH of the solution to below about 3.

2. The one-phase solution of claim 1 containing between about 15% and about 25% of melamine by combined weight of urea and melamine.

3. The one-phase solution of claim 1 wherein said catalyst is an organic acid.

4. The one-phase solution of claim 1 wherein said catalyst is toluene sulfonic acid.

5. The one-phase solution of claim 1 containing 0% by weight melamine.

6. A method of forming an amino resin foam which comprises the steps of:
    (a) mixing a first composition of propylene glycol, urea and formaldehyde with additional urea, methylene chloride and a catalyst which promotes the reaction of urea and formaldehyde, in proportions giving a one-phase solution;
    (b) reacting the urea and formaldehyde in the one-phase solution to form a resin by an exothermic reaction; and
    (c) foaming said resin by the vaporization of methylene chloride in the one-phase solution.

7. The method of claim 6 wherein said methylene chloride is dissolved as a second composition in additional propylene glycol.

8. The method of claim 6 wherein said methylene chloride and catalyst are dissolved as a second composition in additional propylene glycol.

9. The method of claim 6 wherein said first composition is is pre-mixed by combining a urea-formaldehyde concentrate and propylene glycol.

10. The method of claim 6 wherein said first composition also contains melamine.

11. The method of claim 10 wherein said first composition is pre-mixed by dissolving a urea-melamine-formaldehyde concentrate in propylene glycol.

12. The method of claim 11 wherein said urea-melamine-formaldehyde concentrate contains:
    (1) from about 15 to about 25 weight percent urea,
    (2) from about 30 to about 70 weight percent formaldehyde,
    (3) from about 4.0 to about 20 weight percent melamine,
    (4) from about 10 to about 25 weight percent water, and
    (5) from about 0.05 to about 4.0 weight percent of a stabilizer which is a buffering agent which maintains the pH of the concentrate within the range from about 4.0 to about 7.5.

13. The method of claim 11 wherein methylene chloride is dissolved as a second composition in additional propylene glycol.

14. The method of claim 11 wherein methylene chloride and catalyst are dissolved as a second composition in additional propylene glycol.

* * * * *